United States Patent [19]

Groeneweg

[11] 4,240,102

[45] Dec. 16, 1980

[54] IDENTIFICATION SYSTEM FOR SECAM OR SECAM/PAL COLOR TELEVISION RECEIVERS

[75] Inventor: William H. Groeneweg, Ottenbach, Switzerland

[73] Assignee: RCA Corporation, New York, N.Y.

[21] Appl. No.: 20,942

[22] Filed: Mar. 15, 1979

[30] Foreign Application Priority Data

Mar. 16, 1978 [GB] United Kingdom ............... 10457/78

[51] Int. Cl.³ .......................... H04N 9/50; H04N 9/42
[52] U.S. Cl. ......................................... 358/11; 358/25
[58] Field of Search ....................... 358/11, 14, 18, 19, 358/23, 25, 24

[56] References Cited

U.S. PATENT DOCUMENTS 4,133,002  1/1979  Groenewig ............................ 358/18

FOREIGN PATENT DOCUMENTS 1358551  7/1974  United Kingdom ...................... 358/11

Primary Examiner—John C. Martin

Attorney, Agent, or Firm—E. M. Whitacre; W. H. Meagher

[57] ABSTRACT

In a receiver subject to SECAM signal reception, an FM detector responsive to the received signals has its center frequency tuning switched between one SECAM subcarrier center frequency and the other SECAM subcarrier center frequency. Control of the switching, in response to line rate, burst interval pulses and to half line rate waves from a triggered flip-flop, is such that tuning is different in image portions of successive line intervals, but the same in lead-in burst portions of successive line intervals. A first sampler effects sampling of the detector output only during alternate burst occurrences, while a second sampler effects sampling of the detector output during the intervening burst occurrences. Sampler outputs are supplied to a comparator which provides an output suitable for controlling disabling/enabling of flip-flop to establish correct phasing of the switching of the detector tuning. Where receiver is a dual standard receiver also subject to PAL signal reception, another output is derived from the comparator for control of the switching of the receiver between PAL-reception SECAM-reception operating modes.

2 Claims, 4 Drawing Figures

IDENTIFICATION SYSTEM FOR SECAM OR SECAM/PAL COLOR TELEVISION RECEIVERS

The present invention relates generally to identification systems, and particularly to novel identification systems for color television receivers which may serve in identifying and correcting an incorrect mode of line to line switching employed in a SECAM demodulator, and/or in identifying the SECAM or PAL nature of the signal received by a dual-standard SECAM/PAL receiver and controlling the receiver's operating mode accordingly.

In the SECAM color television system, R-Y and B-Y color-difference signals frequency modulate respective subcarriers (4.40625 MHz. and 4.250 MHz.) which are provided alternately on a line-by-line basis in the transmitted signal. An economical approach to processing such signals in a SECAM receiver, which is also attractive for use in dual-standard (SECAM/PAL) receivers, is to convert the SECAM signal into a signal similar to a PAL signal (i.e., a "quasi-PAL" signal) for further processing by standard PAL signal decoding techniques. The system for effecting such conversion is desirably of the general type described in U.K. Pat. No. 1,358,551, wherein the respective SECAM subcarriers are demodulated sequentially by a frequency discriminator, and the resultant color-difference signals amplitude modulate in appropriate sequence respective phases of a subcarrier derived from the PAL crystal oscillator of the PAL decoder apparatus. Where such signal conversion is effected, the present invention may advantageously be employed for identification and correction of an incorrect mode of line-by-line switching of the center frequency tuning of the frequency discriminator. Moreover, where such signal conversion is employed in a dual-standard SECAM/PAL receiver, the system of the present invention may additionally serve to effect automatic control of the operating modes of the dual-standard receiver, pursuant to a further aspect of the present invention.

In a system embodying the present invention, a flip-flop develops half line rate control waves for use in switching the center frequency tuning of the frequency discriminator employed for demodulating received SECAM signals. When the phasing of the flip-flop output is correct, the discriminator is provided with center frequency tuning appropriate to demodulation of the R-Y SECAM subcarrier (4.40625 MHz.) during the image portion of an R-Y line interval of the SECAM signal, and tuning appropriate for demodulation of the B-Y modulated subcarrier (4.250 MHz.) during the image portion of a B-Y line interval of the SECAM. Through the supplemental association of line rate, burst interval control wave, however, the timing of the changes in discriminator center frequency tuning is so controlled that during the lead-in bursts preceding the image portions of both of such R-Y and B-Y line intervals, the discriminator center frequency tuning is the same (e.g., tuned for a center frequency corresponding to the R-Y subcarrier). As a consequence of holding the same (R-Y subcarrier) center frequency tuning for all burst intervals, there appears, in the filtered output of the discriminator, pulses during alternate line interval blanking portions which identify the successive occurrence of a particular (B-Y) line interval.

In accordance with the principles of the present invention, the filtered output of a discriminator subject to center frequency tuning control of the above-described type is applied to a pair of sample-and-hold circuits. Using respective half line rate control waves of mutually opposite phase derived from the flip-flop, and common line rate, burst interval gating pulses, for control of the sampling times of the respective sample-and-hold circuits, one sample-and-hold circuit effects sampling of the filtered discriminator output during the lead-in burst occurrence of alternate line intervals, while the other sample-and-hold circuit effects a sampling of the filtered discriminator output during the lead-in burst occurrence of the intervening line intervals. Comparison of the outputs of the two sample-and-hold circuits in a voltage comparator yields an output indicative of the correctness or incorrectness of the phasing of the flip-flop circuit. When the output is indicative of incorrect flip-flop phasing, the flip-flop is shut down, and then allowed to restart, whereupon a new comparison is effected, with such a process repeated until correct flip-flop phasing is achieved.

In accordance with a further aspect of the present invention, where the aforesaid arrangement of sample-and-hold circuits is incorporated in a dual-standard SECAM/PAL receiver, an output of the voltage comparator may be utilized to effect automatic control of the receiver's operating mode.

In an illustrative implementation of both control features in a dual-standard receiver, response to signal conditions simultaneously establishing a high output from a first one of said sample-and-hold circuits and a low output from the second of said sample-and-hold circuits results in a disabling of the flip-flop and operation of the receiver in a PAL-reception operating mode, while response to signal conditions establishing substantially equal outputs from both sample-and-hold circuits results in an enabling of the flip-flop and operation of the receiver in a PAL-reception operating mode, whereas response to signal conditions simultaneously establishing a high output from the second sample-and-hold circuit and a low output from the first sample-and-hold circuit results in enabling of the flip-flop and operation of the receiver in a SECAM-reception operating mode.

Figure 1:
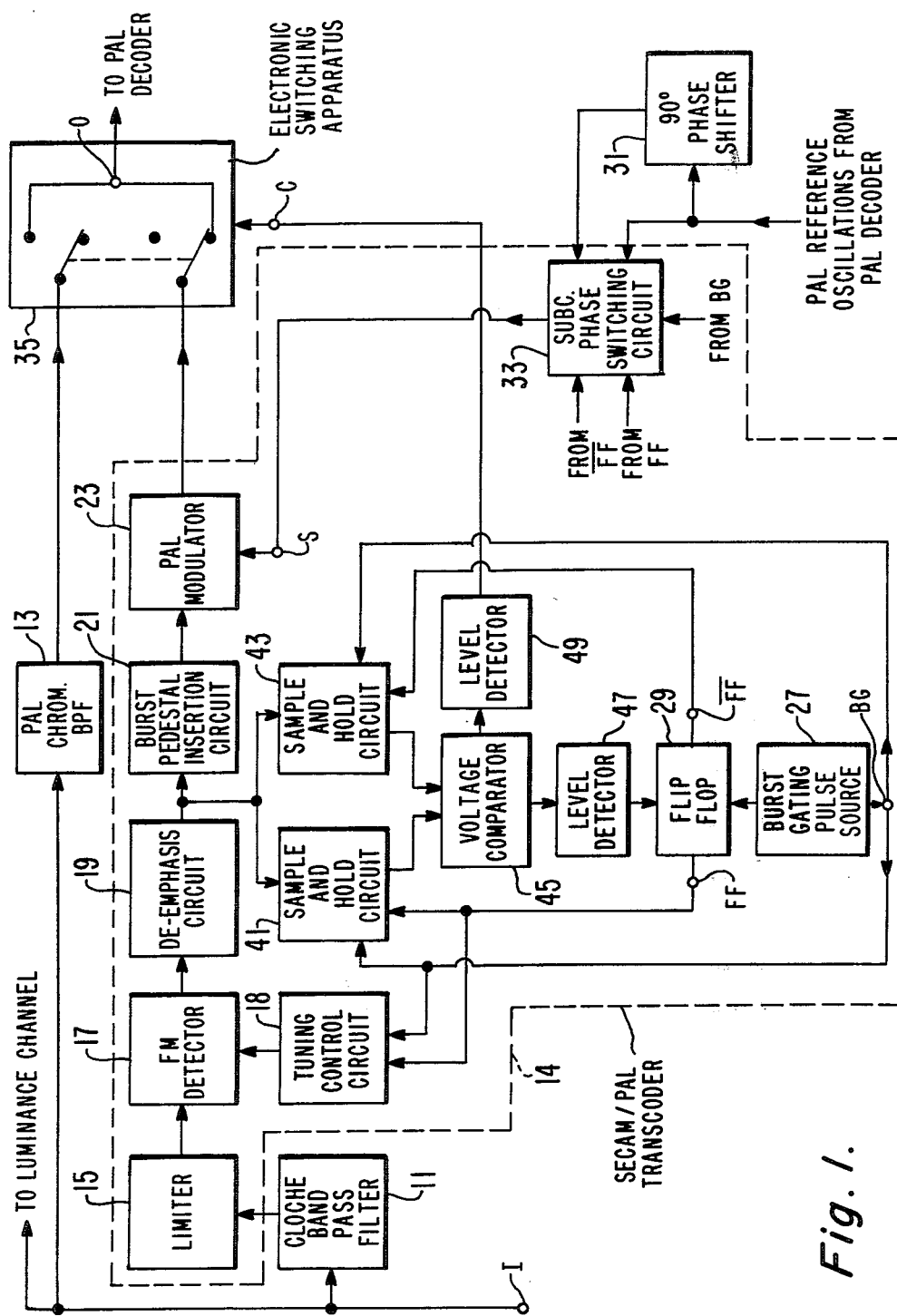
FIG. 1 illustrates, by block diagram representation, dual-standard SECAM/PAL color television receiver apparatus incorporating an identification system pursuant to the principles of the present invention.

In the dual-standard receiver arrangement of FIG. 1, a composite video input signal (derived from the receiver's video detector, not illustrated) appears at input terminal I, and is supplied to a pair of bandpass filters 11 and 13, as well as to the receiver's luminance channel (not illustrated). Bandpass filter 13 encompasses the chrominance signal bandwidth associated with a PAL transmission. Bandpass filter 11 encompasses the chrominance signal bandwidth of a SECAM transmission, and is provided with a bandpass characteristic of a "cloche" or bell-shaped form, appropriately complementary to the characteristic employed for high frequency pre-emphasis of subcarrier sidebands in SECAM signal formation.

The output of bandpass filter 11 is supplied to a SECAM/PAL transcoder 14 embodying the present invention. The transcoder 14 includes a limiter 15, which accepts the output of bandpass filter 11 and delivers a limited version thereof to an FM detector 17, illustratively of the quadrature detector type, such as described, for example, in a copending U.S. patent application Ser. No. 003028, filed Jan. 12, 1979.

A tuning control circuit 18 is associated with the FM detector 17 so as to alter the effective center frequency of its frequency discriminator characteristic in a controlled manner to be described in detail subsequently. The tuning control is such that, during a SECAM signal reception, the output of the single FM detector sequentially comprises, during the image portions of successive line intervals, R-Y and B-Y color-difference signals. This color-difference signal output of detector 17 is supplied to a de-emphasis circuit 19, provided with a characteristic complementary to the modulating signal pre-emphasis employed in SECAM signal formation. The output of the de-emphasis circuit 19 is supplied to a burst pedestal insertion circuit 21, which serves to augment the color-difference signal output of the detector with burst gating pedestals occupying an appropriate segment of the blanking portion of each line interval.

The augmented color-difference signal output of circuit 21 is supplied as a modulating signal to a PAL modulator 23, which modulates the amplitude of subcarrier waves of PAL subcarrier frequency in accordance with the modulated signal. The subcarrier wave input terminal S of modulator 23 receives subcarrier frequency waves in a particular phase sequence appropriate to the formation of a quasi-PAL signal by modulator 23.

The desired phase sequencing of the subcarrier wave input to modulator 23 is carried out by a subcarrier phase switching circuit 33, which receives PAL reference oscillations from a PAL decoder (not shown), both directly and via a 90° phase shifter 31, and which receives line rate control waves from a burst gating pulse source 27 and half line rate control waves from a flip-flop circuit 29. The flip-flop circuit 29, which is subject to triggering by an output of the burst gating pulse source 27, is controlled in its phasing by an identification system, embodying the invention and to be subsequently described.

The operation of the subcarrier phase switching circuit 33 is carried out in such a way during SECAM signal reception that the following results are obtained:

(A) During the image portion of a line interval when a B-Y color difference signal is supplied to the modulating signal input terminal of modulator 23, the PAL subcarrier waves delivered to the subcarrier wave input terminal S of modulator 23 are of a first phase;

(B) During the image portion of a line interval when R-Y color difference signals are supplied to the modulating signal input terminal of modulator 23, the subcarrier waves delivered to terminal S are of a second phase leading the first phase by 90°;

(C) During delivery of the burst gating pedestal immediately preceding R-Y color difference signal delivery to modulator 23, the subcarrier waves delivered to terminal S are of the aforementioned second phase;

(D) During delivery of the burst gate pedestal immediately preceding delivery of B-Y color difference signals to modulator 23, the subcarrier waves delivered to terminal S are of a phase differing from the second phase by 180° and lagging the first phase by 90°.

Reference may be made to the copending U.S. patent application Ser. No. 001166, filed Jan. 5, 1979, for a description of an illustrative circuit arrangement for implementing the switching functions of apparatus 33, and an explanation of the advantages of the above-described phasing sequence.

The output of modulator 23 is supplied to the input terminal of a switch section (S2) of electronic switching apparatus 35, which also includes an additional switching section, S1, ganged with switch section S2. The switching apparatus 35 serves to alter the mode of receiver operation between a SECAM-encoded signal reception mode and a PAL-encoded signal reception mode. In the illustrated (SECAM reception) switching condition of switching apparatus 35, switch section S2 enables the coupling of the output of modulator 35 to the chrominance signal input of the PAL decoder via switch output terminal O.

The output of the previously mentioned PAL bandpass filter 13 is coupled to the input of switch section S1. In the illustrated (SECAM reception) switching condition of switching apparatus 35, switch section S1 disrupts the coupling of the output of filter 13 to the switch output terminal O. However, when switching apparatus 35 is altered to the alternative (PAL reception) switching condition, this coupling is enabled, whereas the modulator output coupling is disabled.

Desirably, switching apparatus 35 may also include a third switching section (not illustrated), serving to effect a disabling of the coupling of a phase control signal to the reference oscillator of the PAL decoder when the receiver is operating in the SECAM reception mode, while enabling such coupling when the receiver is operating in the PAL reception mode (as described in the aforementioned copending U.S. application, Ser. No. 001166). The switching apparatus 35 is controlled automatically, in accordance with recognition of the PAL or SECAM nature of the received signals, by an output of the receiver's identification circuit, now to be explained.

The identification system of the receiver apparatus of FIG. 1 includes a pair of sample-and-hold circuits, 41 and 43, coupled to receive the FM detector's output after processing by de-emphasis circuit 19. Control of the sampling interval for sample-and-hold circuit 41 is effected, in response to line rate pulses of burst interval timing from output terminal BG of burst gating pulse source 27 and to half line rate control waves from output terminal FF of flip-flop 29, in such manner that sample-and-hold circuit 41 effects sampling of the detector output during the lead-in burst occurrence of alternate line intervals. Control of the sampling interval for sample-and-hold circuit 43 is effected, in response to the line rate pulses from terminal BG and to half line rate control waves from the flip-flop's output terminal $\overline{FF}$ (the latter control waves being 180° out of phase with the control waves from terminal FF), in such manner that sample-and-hold circuit 43 effects sampling of the detector output during the lead-in burst occurrence of the intervening line intervals.

The respective outputs of the sample-and-hold circuits 41 and 43 are subject to comparison in a voltage comparator 45. A first level detector 47, responsive to a first output of voltage comparator 45, provides an output effecting control of the disabling or enabling of flip-flop 29 in dependence upon the level of said first output. A second level detector 49, responsive to a second output of voltage comparator 45, provides an output effecting control of the switching state of electronic switching apparatus 35 in dependence upon the level of said second input.

For an understanding of the manner in which the above-described identification system operates, it is appropriate to first consider the manner in which tuning control circuit 18 operates. For the single FM detector 17 to sequentially develop R-Y and B-Y color-difference signals at its output, it is desired that its center frequency tuning be appropriate for demodulation of the R-Y SECAM subcarrier (4.40625 MHz.) during the image portion of an R-Y line interval, and appropriate for demodulation of the B-Y SECAM subcarrier (4.250 MHz.) during the image portion of a B-Y line interval of the SECAM signal. Accordingly, tuning control circuit 18 effects a line-to-line switching of the center frequency tuning in response to half-line rate control waves from the flip-flop terminal FF. If the flip-flop phasing is correct, this will result in tuning appropriate for R-Y subcarrier demodulation during image portions of R-Y line intervals, and tuning appropriate for B-Y line intervals; however, if the flip-flop phasing is incorrect, the result will be inappropriate center frequency tuning for the respective line interval image portions.

To aid in identification of such incorrect phasing when it occurs, line rate pulses of burst interval timing from terminal BG are utilized in combination with the half line rate control waves from terminal FF to effect a composite control of the center frequency tuning, whereby the timing of the changes in center frequency tuning is such that, during the lead-in bursts preceding the image portions of both R-Y and B-Y intervals, the center frequency tuning is the same (e.g., tuned for a center frequency corresponding to the R-Y subcarrier).

As a consequence of holding the same (R-Y) center frequency tuning for all burst intervals, there appears in the output of detector 17 pulses during those alternate line interval blanking portions when the lead-in burst frequency deviates from the R-Y center frequency (i.e., during each lead-in burst occurrence preceding a B-Y line interval). Such pulses are not developed during the interval line interval blanking portions when the lead-in burst frequency is equal to the R-Y center frequency (i.e., during each lead-in burst occurrence preceding an R-Y line interval).

Illustratively, the relationship between the poling of the respective half line rate waves controlling the sampling times of the respective sample-and-hold circuits 41, 43 and the poling of the half line rate waves controlling the tuning changes of detector 17 is such that the sampling interval for sample-and-hold circuit 41 occurs during each of the alternate lead-in burst appearances which immediately precede the switching (by control circuit 18) of the detector tuning to the B-Y center frequency, whereas the sampling interval for sample-and-hold circuit 43 occurs during each of the intervening lead-in burst appearances. With such a relationship, the B-Y line indicating pulses developed during alternate line interval blanking portions by detector 17 will be sampled by sample-and-hold circuit 41 when the flip-flop phasing is correct, whereas such B-Y line indicating pulses will be sampled by sample-and-hold circuit 43 when the flip-flop phasing is incorrect.

Illustratively, comparator 45, which compares the output voltage levels of the respective sample-and-hold circuits, develops a first output (which is delivered to level detector 47) which (a) goes high when the output of sample-and-hold circuit 41 is at a pulse presence indicating level while the output of sample-and-hold circuit 43 is at a pulse absence indicating level (which condition occurs, during SECAM signal reception, when the flip-flop phasing is correct); and (b) goes low when the output of sample-and-hold circuit 43 is at a pulse presence indicating level while the output of sample-and-hold circuit is at a pulse absence indicating level (which condition occurs, during SECAM signal reception, when the flip-flop phasing is incorrect). Level detector 47 discriminates between the high level of said first output under condition (a) and the low level of said first output under condition (b) to develop an output which effects disabling of flip-flop 29 only when condition (b) is sensed. When the high level of said first output of comparator 45 is present, indicating correctness of flip-flop phasing, the output of level detector 47 is such as to permit normal triggered operation of flip-flop 29.

Under circumstances where the outputs of the respective sample-and-hold circuits are substantially equal, said first output of comparator will be at an intermediate level. One example of a condition that produces such a result is the sampling action that occurs during a SECAM signal reception period when flip-flop 29 is disabled. In the absence of the sampling control effects of the half line rate control waves from flip-flop 29, both of the sample-and-hold circuits 41 and 43 will sample each successive lead-in burst, and their outputs will approach equality, causing the first output of the comparator to rise toward the intermediate level. Level detector 47 responds to such intermediate level conditions by terminating the flip-flop disabling action. That is, the output of level detector under intermediate level conditions is such as to permit normal triggered operation of flip-flop 29.

Another example of a condition that results in an intermediate level for said first output of comparator 45 is reception of a PAL encoded signal. During the line interval blanking portions of a PAL signal color synchronizing bursts of the PAL subcarrier frequency appear. Since the PAL subcarrier frequency (4.43361875 MHz.) differs from the R-Y center frequency (4.40625 MHz.), and since bursts of such differing frequency occur in successive line intervals, the output of detector 17 will comprise similar pulses in successive burst intervals, and the outputs of the respective sample-and-hold circuits will thus be substantially equal.

Illustratively, comparator 45 is arranged to provide a second output (which is delivered to level detector 49) which: (a) goes high when the output of sample-and-hold circuit 43 stays at a pulse presence indicating level while the output of sample-and-hold circuit 41 stays at a pulse absence indicating level (occurring, during SECAM signal reception, when the flip-flop phasing is incorrect); (b) goes low when the output of sample-and-hold circuit 43 stays at a pulse absence of sample-and-hold circuit 43 stays at a pulse absence indicating level while the output of sample-and-hold circuit 41 stays at a pulse presence indicating level (occurring, during SECAM signal reception, when the flip-flop phasing is correct; and (c) goes to an intermediate level when the outputs of the respective sample-and-hold circuits are substantially equal (occurring during PAL signal reception). Level detector 49 discriminates between the high, intermediate and low levels which said second output of comparator 45 may attain to develop an output which effects switching (by apparatus 35) of the receiver to the SECAM-reception mode of operation only for condition (b). Thus, only when the low level of the second output of the comparator indicates SECAM signal presence in association with correct phasing of flip-flop 29 is the output of modulator 23 delivered to terminal O. When said second output of comparator 45 is at an intermediate or a high level, the output of level detector 49 is such as to maintain switching apparatus 35 in its non-illustrated switching condition, delivering the output of filter 13 to terminal O.

Accordingly, during PAL signal reception, the receiver is automatically maintained in its PAL-reception, the receiver is subject to automatic switching to a SECAM-reception mode of operation, but such switching is effected only upon attainment of correct phasing for flip-flop 29. When SECAM signal reception in association with incorrect flip-flop phasing is sensed, flip-flop 29 is shut down, and then allowed to restart, with such a sequence repeating, if necessary, until correct phasing is attained, whereupon switching to the SECAM-reception mode of operation is effected.

Figure 2:
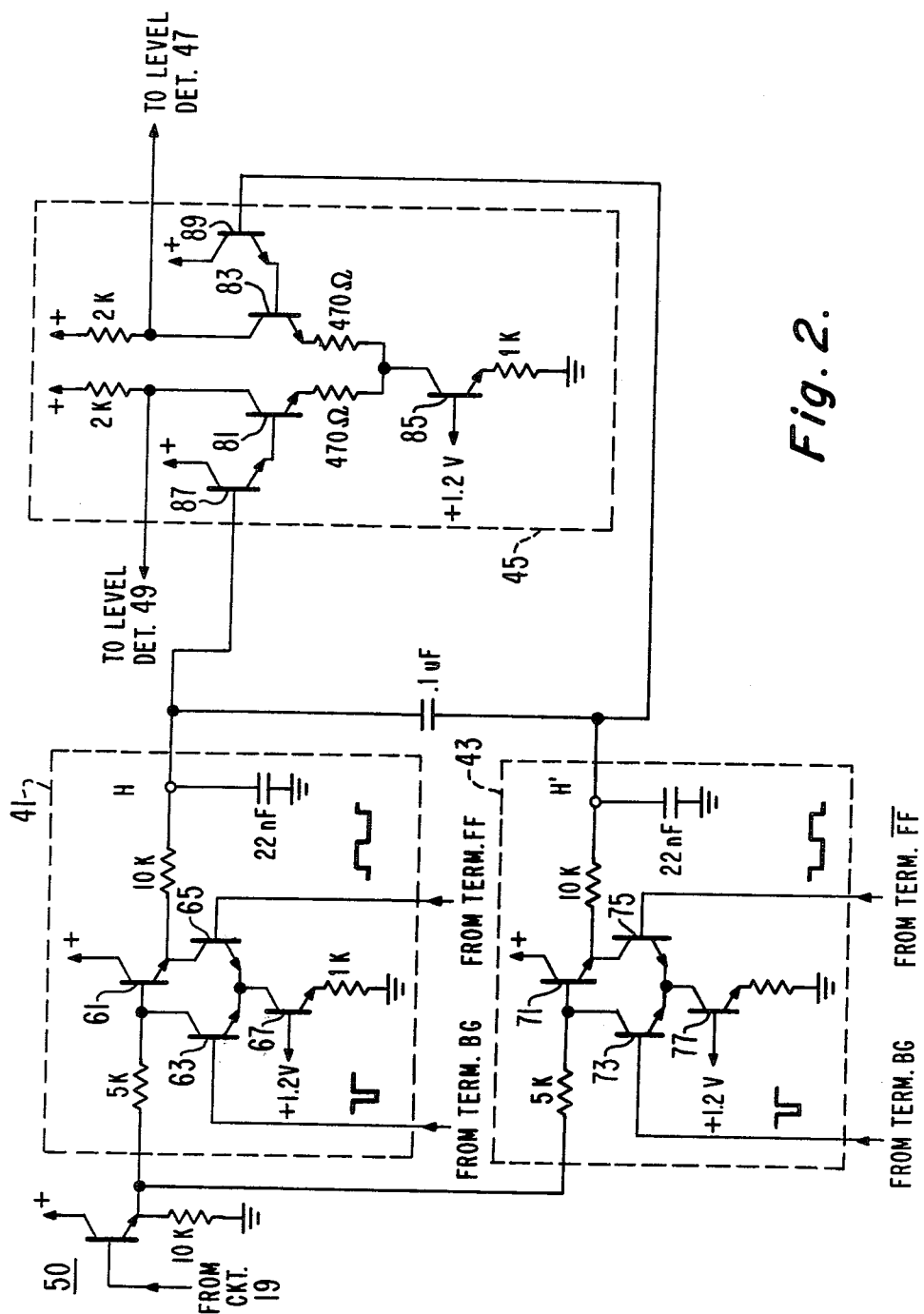
FIG. 2 illustrates schematically circuit arrangements which may be advantageously employed in implementing the functions of elements of the identification system of FIG. 1.

FIG. 2 schematically illustrates circuit arrangements which may be advantageously employed in implementing the above-described functions of sample-and-hold circuits 41, 43 and comparator 45 of the FIG. 1 system. In FIG. 2, an emitter-follower 50 couples the output of the de-emphasis circuit 19 (FIG. 1) to the respective inputs of the sample-and-hold circuits 41 and 43, each of which comprises a sampler of a general type disclosed, for example, in U.S. Pat. No. 4,133,002.

In sampler 41, a pair of switching transistors 63, 65 are disposed in a differential configuration, with emitter electrodes joined and returned to ground via a current source transistor 67. The collector electrode of transistor 63 is directly connected to the base electrode of an emitter follower transistor 61, and the collector electrode of transistor 65 is directly connected to the emitter electrode of transistor 61. A first resistor couples the output of emitter-follower 50 to the base of transistor 61, and a second resistor couples the emitter of transistor 61 to the sampler output terminal H. A hold capacitor is coupled between output terminal H and ground. A train of line rate, negative-going pulses of burst interval timing from terminal BG (FIG. 1) is applied to the base of switching transistor 63, while half line rate square waves from flip-flop terminal FF (FIG. 1) are applied to the base of switching transistor 65. The levels associated with these control inputs are so related that only during alternate burst intervals, when line rate pulse appearance coincides with a portion of the square wave's positive half-cycle, is transistor 63 rendered non-conducting and transistor 65 rendered conducting. Under these conditions, transistor 61 is keyed on to develop a voltage across the hold capacitor representative of the FM detector output during this sampling interval. During times intervening such sampling intervals, circuit 41 is in the hold state, with transistor 63 conducting and transistors 61 and 65 off.

Transistors 71, 73, 75, and 77 are disposed in sampler 43 in the same manner as transistors 61, 63, 65, and 67 in sampler 41, with the exception that the base of switching transistor 75 receives half line rate square waves (from terminal $\overline{FF}$, FIG. 1) which are opposite in phase to those supplied to the base of transistor 65. As a consequence of this difference in control, the sampling intervals for sampler 43 correspond to those burst intervals intervening the alternate burst intervals when sampler 41 effects its sampling.

Comparator 45 comprises a pair of transistors 81, 83 disposed in a differential amplifier configuration, with transistor 85 serving as a current source transistor therefore, with emitter-follower transistor 87 coupling the output terminal H of sampler 41 to the base of transistor 81, and with emitter-follower transistor 89 coupling the output terminal H' of sampler 43 to the base of transistor 83. A first comparator output for delivery to level detector 47 (FIG. 1) is developed at the collector of transistor 83, and a second comparator output for delivery to level detector 49 is developed at the collector of transistor 81.

Figure 3:
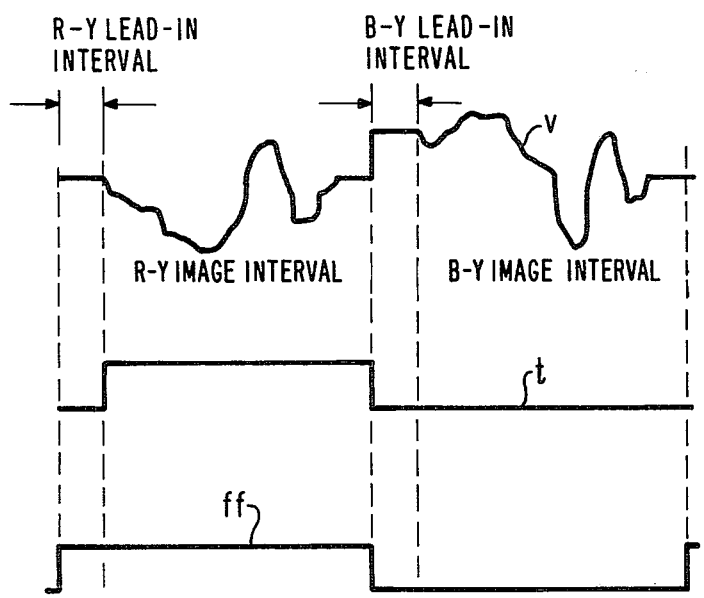
FIGS. 3 and 4 illustrate graphically waveforms of aid in explaining the operation of the identification system of FIGS. 1 and 2.
Figure 4:
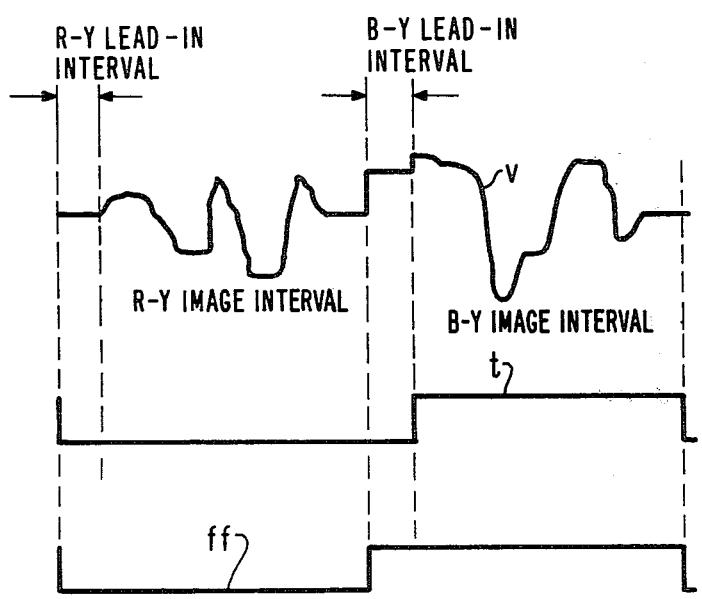

FIGS. 3 and 4 show respective sets of waveforms which may be of aid in explaining the operation of the system of FIG. 1 as implemented by the circuits of FIG. 2.

In FIG. 3, waveforms "v," "t," and "ff" illustrate, respectively, the FM detector output delivered by emitter-follower 50, a composite control wave for tuning control circuit 18, and the half line rate control waves developed at flip-flop terminal FF, under first illustrative conditions of: SECAM signal reception with incorrect flip-flop phasing.

Illustratively, positive-going excursions of the tuning control wave "t" effect switching of the FM detector tuning to the B-Y center frequency. As the illustrated relationship of waves "v" and "t" shows, the tuning switching is incorrectly phased: B-Y center frequency tuning occurring during the R-Y line interval's image portion, and R-Y center frequency tuning occurring during the B-Y line interval's image portion. As waveform "ff" shows, the phasing of the waves provided at terminal FF in this instance is such that sampler 41 effects its sampling during the R-Y lead-in burst occurrence, with a resultant low level output (whereas sampler 43 effects its sampling during the B-Y lead-in burst occurrence, with a resultant high level output). Under these circumstances, the collector of transistor 83 goes low, causing level detector 47 to effect a disabling of flip-flop 29, while the collector of transistor 81 goes high, causing level detector 49 to maintain switching apparatus 35 in the PAL-reception switching state.

In FIG. 4, the same waveforms "v," "t," and "ff" are shown, under second illustrative conditions: SECAM signal reception with correct flip-flop phasing.

Comparison of waveforms "v" and "t" in the FIG. 4 set reveals correct phasing of the tuning switching: B-Y center frequency tuning occurring during the B-Y line interval's image portion, and R-Y center frequency tuning occurring during the R-Y line interval's image portion. The phasing of the waves (waveform "ff")provided at terminal FF, in this instance, is such that sampler 41 effects its sampling during the B-Y lead-in burst occurrence, with a sampling during the R-Y lead-in burst occurrence, with a resultant low level output). Under these circumstances, the collector of transistor 83 goes high, causing level detector 47 to permit normal triggered operation of flip-flop 29, while the collector of transistor 81 goes low, causing level detector 49 to shift switching apparatus 35 to the SECAM-reception switching state.

What is claimed is:

1. In a color television receiver subject to reception of composite color television signals inclusive of a chrominance component enclosed in SECAM format; said SECAM-encoded chrominance component comprising, during image portions of alternate line intervals, a first subcarrier frequency modulated in accordance with a first color-difference signal, and during image portions of the intervening line intervals, a second subcarrier frequency modulated in accordance with a second color-difference signal, with a lead-in burst of oscillations at the center frequency of said first subcarrier preceding the image portion of each of said alternate line intervals, and with a lead-in burst of oscillations at the center frequency of said second subcarrier preceding the image portion of each of said intervening line intervals; apparatus comprising:

an FM detector, responsive to the received signals, and subject to operation in either a first mode with center frequency tuning corresponding to the center frequency of said first subcarrier, or a second mode with center frequency tuning corresponding to the center frequency of said second subcarrier;

a triggered flip-flop circuit for providing, when enabled, a pair of half line rate wave outputs of mutually opposite phase;

a source of line rate pulses timed to substantially coincide with the periods of appearance of said lead-in bursts;

means, responsive to said line rate pulses and to one of said pair of half line rate wave outputs, for controlling the operating mode of said FM detector such that said FM detector operates in respectively different ones of said modes during the image portions of successive line intervals but operates in only said first mode during each period of lead-in burst appearance;

first sampling means, coupled to receive an output of said FM detector, and responsive to said line rate pulses and to said one of said pair of half line rate wave outputs, for sampling the output of said FM detector only during alternate ones of said periods of appearance of lead-in bursts;

second sampling means, coupled to receive said output of said FM detector, and responsive to said line rate pulses and to the other of said pair of half line rate wave outputs, for sampling the output of said FM detector only during the intervening ones of said periods of appearance of said lead-in bursts;

means for comparing the output levels of said first and second sampling means; and means, responsive to an output of said comparing means, for disabling said flip-flop circuit only when the output level of a given one of said sampling means significantly exceeds the output level of the other of said sampling means.

2. Apparatus in accordance with claim 1 wherein said receiver is alternatively subject to reception of composite color televison signals inclusive of a chrominance component encoded in a PAL format, and includes a PAL chrominance component decoder; said apparatus also including:

means, responsive to an output of said FM detector, for forming quasi-PAL chrominance component;

a path for received signals bypassing said FM detector and said quasi-PAL chrominance component forming means;

switching means for supplying the output of said quasi-PAL chrominance component forming means to said decoder when in a first switching state, and for supplying the output of said bypassing path to said decoder when in a second switching state; and means, responsive to an output of said comparing means, for causing said switching means to assume said first switching state only when the output level of the other of said sampling means significantly exceeds the output level of said given one of said sampling means.

* * * * *

UNITED STATES PATENT AND TRADEMARK OFFICE
CERTIFICATE OF CORRECTION

PATENT NO. : 4,240,102
DATED : December 16, 1980
INVENTOR(S) : Willem H. Groeneweg It is certified that error appears in the above—identified patent and that said Letters Patent is hereby corrected as shown below:

Front page: Inventor's name "William" should be -- Willem --.

Column 5, line 23, after "B-Y" insert -- subcarrier demodulation during image portions of B-Y --; line 34, after "B-Y" should be -- line --; line 44, the first "interval" should be -- intervening --.

Column 6, lines 58-59, after first "pulse absence" delete "of sample-and-hold circuit 43 stays at a pulse absence".

Column 7, line 13, after "PAL-reception" insert -- mode of operation. During SECAM signal reception --.

Column 8, line 56, after "a" insert -- resultant high level output (whereas sampler 43 effects its --; line 68 "enclosed" should be -- encoded --.

Signed and Sealed this

Twenty-first Day of April 1981

[SEAL]

Attest:

RENE D. TEGTMEYER

Attesting Officer  Acting Commissioner of Patents and Trademarks